United States Patent
Lackner et al.

(10) Patent No.: US 8,246,731 B2
(45) Date of Patent: Aug. 21, 2012

(54) SYSTEMS AND METHODS FOR EXTRACTION OF CARBON DIOXIDE FROM AIR

(75) Inventors: Klaus S. Lackner, Dobbs Ferry, NY (US); Frank S. Zeman, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 312 days.

(21) Appl. No.: 12/762,782

(22) Filed: Apr. 19, 2010

(65) Prior Publication Data

US 2010/0202937 A1    Aug. 12, 2010

Related U.S. Application Data

(63) Continuation of application No. 11/579,714, filed as application No. PCT/US2005/015454 on May 4, 2005, now Pat. No. 7,699,909.

(60) Provisional application No. 60/568,091, filed on May 4, 2004, provisional application No. 60/624,145, filed on Nov. 1, 2004.

(51) Int. Cl.
*B01D 53/14* (2006.01)
(52) U.S. Cl. .......................................... 96/243; 96/371
(58) Field of Classification Search ............... 95/236; 423/220, 234, 432, 437.1, 438; 96/234, 243, 96/257, 275, 296, 371
See application file for complete search history.

(56) References Cited

U.S. PATENT DOCUMENTS

| | | | |
|---|---|---|---|
| 3,406,953 A * | 10/1968 | Moore | 261/79.2 |
| 3,767,176 A * | 10/1973 | Engalitcheff et al. | 261/111 |
| 3,880,981 A | 4/1975 | Garingarao et al. | |
| 3,969,482 A * | 7/1976 | Teller | 423/235 |
| 4,140,602 A | 2/1979 | Lewis et al. | |
| 4,460,552 A * | 7/1984 | Zakrzewski | 423/210 |
| 5,520,894 A | 5/1996 | Heesink et al. | |
| 5,792,440 A | 8/1998 | Huege | |
| 6,200,543 B1 | 3/2001 | Allebach et al. | |
| 6,890,497 B2 | 5/2005 | Rau et al. | |
| 7,384,621 B2 | 6/2008 | Stevens et al. | |
| 7,604,787 B2 | 10/2009 | Maroto-Valer et al. | |

OTHER PUBLICATIONS

Herzog, H. J., E. M. Drake, "Carbon Dioxide Recovery and Disposal From Large Energy Systems," Annu. Rev. Energy Environ., vol. 21: p. 145-166, 1996.

White, C. M., B. R. Strazisar, E. J. Granite, J. S. Hoffman, H. W. Pennline, "Separation and Capture of CO2 from Large Stationary Sources and Sequestration in Geological Formations—Coalbeds and Deep Saline Aquifers," Journal of the Air and Waste Management Association, vol. 55: p. 645-715, 2003.

(Continued)

*Primary Examiner* — Frank Lawrence, Jr.
(74) *Attorney, Agent, or Firm* — Wiggin and Dana LLP; Anthony P. Gangemi

(57) ABSTRACT

The present invention describes methods and systems for extracting, capturing, reducing, storing, sequestering, or disposing of carbon dioxide ($CO_2$), particularly from the air. The $CO_2$ extraction methods and systems involve the use of chemical processes. Methods are also described for extracting and/or capturing $CO_2$ via exposing air containing carbon dioxide to a solution comprising a base—resulting in a basic solution which absorbs carbon dioxide and produces a carbonate solution. The solution is causticized and the temperature is increased to release carbon dioxide, followed by hydration of solid components to regenerate the base.

10 Claims, 3 Drawing Sheets

OTHER PUBLICATIONS

Boynton, R. S., "Chemistry and Technology of Lime and Limestone," New York: Interscience Publishers, p. 204-206, 1966.

Zsako, J., M. Hints, "Use of Thermal Analysis in the Study of Sodium Carbonate Causticization by Means of Dolomitic Lime," Journal of Thermal Analysis, vol. 53: p. 323-331, 1998.

Astarita, G., "Mass Transfer with Chemical Reaction," Amsterdam: Elsevier Publishing Company, p. 144-152, 1967.

Desideri, U., A. Paolucci, "Performance Modelling of a Carbon Dioxide Removal System for Power Plants," Energy Conversion and Management, vol. 40: p. 1899-1915, 1999.

Olsson, J., A. Jernqvist, G. Aly, "Thermophysical Properties of Aqueous NaOH—H2O Solutions at High Concentrations," International Journal of Thermophysics, vol. 18(3): p. 779-793, 1997.

Konno, H., Y. Nanri, M. Kitamura, "Crystallization of Aragonite in the Causticizing Reaction," Powder Technology, vol. 123: p. 33-39, 2002.

Besra, L., D. K. Sengupta, S. K. Roy, "Particle Characteristics and Their Influence on Dewatering of Kaolin, Calcite and Quartz Suspensions," Int. J. Miner. Process., vol. 59: p. 89-122, 2000.

Singh, B. P., "Technical Note Ultrasonically Assisted Rapid Solid-Liquid Separation of Fine Clean Coal Particles," Minerals Engineering, vol. 12(4): p. 437-443, 1999.

Hanson, C., H. Theliander, "Steam Drying and Fluidized-Bed Calcination of Lime Mud," Tappi Journal, vol. 76(11): p. 181-188, 1993.

Dillon, D. J., R. S. Panesar, R. A. Wall, R. J. Allam, V. White, J. Gibbins, M. R. Haines, "Oxy-Combustion Processes for CO2 Capture From Advanced Supercritical PF and NGCC Power Plant," Greenhouse Gas Control Technologies 7, Vancouver, Canada, 2004.

Keith, D. W., M. Ha-Duong, "Co2 Capture From the Air: Technology Assessment and Implications for Climate Policy," Greenhouse Gas Control Technologies 6, Kyoto, Japan: Pergamon, 2002.

Blok, K., R. H. Williams, R. E. Katofsky, C. A. Hendriks, "Hydrogen Production From Natural Gas, Sequestration of Recovered CO2 in Depleted Gas Wells and Enhanced Natural Gas Recovery," Energy, vol. 22(2/3): p. 161-168, 1997.

Meier, A., E. Bonaldi, G. M. Cella, W. Lipinski, D. Wuillemin, R. Palumbo, "Design and Experimental Investigation of a Horizontal Rotary Reactor for the Solar Thermal Production of Lime," Energy, vol. 29: p. 811-821, 2004.

International Preliminary Report from the International Bureau, International Application No. PCT/US2005/015453, filed May 4, 2005.

International Search Report and the Written Opinion of the International Searching Authority, International Application No. PCT/US2005/015453, filed May 4, 2005.

International Preliminary Report from the International Bureau, International Application No. PCT/US2005/015454, filed May 4, 2005.

International Search Report and the Written Opinion of the International Searching Authority, International Application No. PCT/US2005/015454, filed May 4, 2005.

* cited by examiner

SYSTEMS AND METHODS FOR EXTRACTION OF CARBON DIOXIDE FROM AIR

This patent disclosure contains material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described and claimed herein.

BACKGROUND OF THE INVENTION

The combustion of fossil fuels provides the vast majority of the global energy supply. The necessary byproduct of this combustion is carbon dioxide ($CO_2$) gas. Accumulation of $CO_2$ gas in the atmosphere has provoked concern regarding its effect on the global climate and spawned worldwide interest in the reduction of $CO_2$ emissions to the atmosphere.

One approach of managing atmospheric emissions is through a chemical process known as air extraction, by which $CO_2$ is removed directly from the atmosphere.

The present invention presents a preliminary design for a plant that used wet scrubber techniques to remove $CO_2$ directly from air.

SUMMARY OF THE INVENTION

The present invention relates generally to the field of extractors, including those that work to extract carbon dioxide from air. The present invention relates to methods and devices for extracting carbon using wet scrubbing techniques.

It is a general aspect of the present invention to provide new methods or processes for extracting, reducing, capturing, disposing of, sequestering, or storing $CO_2$ or removing excess $CO_2$ from the air, as well as new methods and processes for reducing, alleviating, or eliminating $CO_2$ in the air, and/or the emissions of $CO_2$ to the air. Another aspect of the invention relates to apparatuses, such as wind or air capture systems, to remove or extract $CO_2$ from air. As used herein, the term "air" refers to ambient air, rather than emitted gas, such as gas that is emitted from a smoke stack or an exhaust pipe. While the latter may contain air, it is not typically considered ambient air. In accordance with the present invention, extraction of $CO_2$ from air involves source gas, which is at atmospheric temperature, pressure and ambient concentration of $CO_2$.

One approach of managing atmospheric emissions is through a chemical process known as air extraction, by which CO2 is removed directly from the atmosphere. This can be accomplished using wet scrubbing techniques to extract CO2 from air then return the CO2 to a gaseous form after several chemical transformations. The wet scrubbing is accomplished by contacting a sodium hydroxide solution with the atmosphere. The chemical absorption of CO2 produces a solution of sodium carbonate, which is then causticized using calcium hydroxide. The causticization process transfers the carbonate ion from the sodium to the calcium cation and from the liquid to solid state. The product of this reaction is an emulsion of precipitated calcite (calcium carbonate) in a regenerated sodium hydroxide solution. In order to perform the thermal decomposition of calcite (calcination), it is necessary to filter and dry the calcite. It is not necessary to dewater the calcite completely as some steam is required for the subsequent regeneration of calcium hydroxide. The product of calcination is gaseous CO2 and calcium oxide (solid lime). Hydrating the calcium oxide to regenerate the calcium hydroxide completes the cycle.

The present invention is generally directed to methods and components that can be utilized to design a plant comprising a self-contained system for extraction of $CO_2$ directly from air using wet scrubbing techniques.

One aspect of the invention is directed to the implementation of mechanical dewatering steps to reduce the water content of the wet calcite before it enters the calciner. These steps comprise drying schemes which incorporate the heat of calcium oxide hydroxylation into the drying of the calcium carbonate precipitate. An example of a drying scheme includes, but is not limited to, hot steam produced when the process is conducted at high temperatures raising the temperature of the calcite filter cake and thus cause release of the remnant water as steam which is transported back to the slaking unit where it is used to hydroxylate calcium oxide.

In another aspect of the invention, the wet calcite filter cake is subjected to a mechanical dewatering step which includes the application of high frequency sonic energy to decrease the water content of the filter cake.

The invention also provides for the use of liquid filtration aids to assist in calcite precipitate filtration and subsequent thermal decomposition of calcite. Examples of liquid filtration aids include, but are not limited to, surfactants such as sodium salts of fatty acids.

The invention further provides for the use of solid filtration aids to assist in calcite precipitate filtration and subsequent thermal decomposition of calcite. Examples of solid filtration aids include, but are not limited to, rice husks.

Another aspect of the invention comprises the use of a hollow screw head as a heat exchanger to preheat the combustion gases (natural gas and oxygen) prior to injection into the reaction vessel. This aspect is exemplified by, but not limited to, a screw comprising a hollow rectangular strip of metal placed at the opening in the bottom of the reaction vessel where falling calcium oxide particles will contact the metal resulting in heat transfer to the screw then to the combustion gases.

The invention also provides for a device designed for scrubbing a volume of gas in a contained system comprising a laminar forced draft vertical tower with solid outside walls and interior vertical tubes through which scrubbing liquid flows. In one aspect, the air flows concurrent to the liquid and air flow can be generated by fans or active or passive means.

The invention further provides for the use of passive energy sources to move air through the forced draft system. For example, wind can be harnessed using a venture device to create a vacuum which draws air into the tower of the forced draft system. In another example, solar energy can be used to heat a volume of air encased in a glass structure connected to the top of the tower of the forced draft system. As the air in the glass structure is heated, the pressure inside the glass structure rises and draws air through the tower. The invention is not limited to these examples.

In yet another aspect, the invention uses a small scale coal fired heat source to generate steam for power generation or to provide heat to calcite particles for calcinations. In a non-limiting example, small tubes filled with coal are equipped with an oxygen feed, a flame and an ash collector where the flame ignites the oxygen and coal to maintain a steady temperature inside the tube.

In another of its aspects, the present invention provides a method of carbon capture that removes $CO_2$ from air. The method also advantageously serves to regenerate the sorbent employed in the method. The method involves the use of an alkaline liquid sorbent, e.g., sodium hydroxide (NaOH)-based, to remove $CO_2$ from ambient air and produce carbonate ions. The resultant sodium carbonate ($Na_2CO_3$) solution is mixed or reacted with calcium hydroxide ($Ca(OH)_2$) to produce sodium hydroxide and calcium carbonate ($CaCO_3$) in a causticizing reaction, which transfers the carbonate anion from the sodium to the calcium cation. The calcium carbonate precipitates as calcite, leaving behind a regenerated sodium hydroxide sorbent, thus regenerating the sorbent. The calcite precipitate is dried, washed and thermally decomposed to produce lime (CaO) and gaseous $CO_2$ in a calcination process. Thereafter, the lime is hydrated (slaked) to regenerate the calcium hydroxide sorbent. In a related aspect, this method can be implemented using air capturing systems, for example, towers or air or wind capture units of various design, which function as the physical sites where $CO_2$ is captured and removed from the air.

In another aspect, the present invention provides a method for extracting or capturing carbon dioxide from air, comprising: (a) exposing air containing carbon dioxide to a solution comprising a base, resulting in a basic solution which absorbs carbon dioxide and produces a carbonate solution; (b) causticizing the carbonate solution with a titanate-containing reagent; (c) increasing the temperature of the solution generated in step (b) to release carbon dioxide; and (d) hydrating solid components remaining from step (c) to regenerate the base comprising step (a).

In another aspect, the present invention provides a method for extracting or capturing carbon dioxide from air comprising: (a) exposing air containing carbon dioxide to a solution comprising a base, thus resulting in a basic solution which absorbs carbon dioxide and produces a carbonate solution; (b) causticizing the carbonate solution with a calcium hydroxide containing reagent; (c) calcining the resulting calcium carbonate under thermal conditions in which one or more mixed solid oxide membranes is interposed between the combustion gases and the input air; and (d) hydrating the product lime to regenerate the calcium hydroxide involved in step (b).

In yet another aspect the present invention provides systems and apparatuses for extracting, capturing, removing, or entraining $CO_2$ from the air. Such capture apparatuses can include wind and air capture systems or a cooling-type tower for extracting, capturing, removing, or entraining $CO_2$ as further described herein. Fan driven systems are also encompassed.

In another embodiment, the present invention embraces methods and systems for extracting $CO_2$ from the air using liquid sorbents. Accordingly, the invention provides a method of carbon capture that removes $CO_2$ from air using solid oxide membrane and liquid sorbents. Suitable sorbents include basic solutions, such as sodium hydroxide (NaOH) or potassium hydroxide (KOH), and other often viscous fluids, which are typically caustic. More specifically, the method involves the use of a hydroxide-based, alkaline liquid sorbent, e.g., NaOH solutions and the like, to absorb and remove $CO_2$ from ambient air and produce carbonate ions. The resultant sodium carbonate ($Na_2CO_3$) solution is mixed or reacted with calcium hydroxide ($Ca(OH)_2$) to produce sodium hydroxide and calcium carbonate ($CaCO_3$) in a causticizing reaction, which transfers the carbonate anion from the sodium to the calcium cation. The calcium carbonate precipitates as calcite, leaving behind a regenerated sodium hydroxide sorbent, thus, regenerating the sorbent. The calcite precipitate is dried, washed and thermally decomposed to produce lime (CaO) in a calcination process. The thermal decomposition is preferably performed to avoid mixing the $CO_2$ resulting form the combustion process, providing the heat with ambient air. This embodiment uses solid oxide membranes to separate input air from the combustion process. Oxygen at elevated temperatures can pass through these membranes. After calcination, the lime is hydrated in a slaking process. In a related embodiment, this method can be implemented using air capturing systems, for example, towers or air capture units of various design, which function as the physical sites where $CO_2$ is captured and removed from the air.

In yet another embodiment, the resultant NaOH is recycled using sodium tri-titanate rather than calcium hydroxide. In this embodiment, the reaction occurs in a molten rather than in an aqueous state. As a result, the absorption solution is highly caustic in order to minimize the amount of water evaporation required. In another embodiment, the invention encompasses a method for capturing carbon dioxide from air, comprising (a) exposing air containing carbon dioxide to a solution comprising a base resulting in a basic solution which absorbs carbon dioxide and produces a carbonate solution; (b) causticizing the carbonate solution with a titanate containing reagent; (c) increasing the temperature of the solution generated in step (b) to release carbon dioxide; and (d) hydrating solid components remaining from step (c) to regenerate the base comprising step (a). In one embodiment of this method, the base of step (a) is selected from sodium hydroxide, calcium hydroxide, or potassium hydroxide. In another embodiment, the carbonate solution of step (a) of the method is a sodium carbonate ($Na_2CO_3$) solution. In another embodiment of the method, the solution of step (a) is causticized with sodium tri-titanate.

In related embodiments, the present invention provides systems and apparatuses for extracting, capturing, or entraining $CO_2$ from the air or wind. Such capture apparatuses can include a wind capture system or a cooling-type tower for extracting, sequestering, or capturing $CO_2$ as further described herein. Fan driven systems are encompassed. Wind capture systems refer to freestanding objects similar in scale to a wind energy turbine. For example, such devices contain a pivot that ensures that contacting surface can follow the wind directions. The device can operate with either liquid or solid $CO_2$ sorbents. A liquid based system operates using pumps at the base, which pump sorbent to the top of the device. Once at the top, the sorbent flows under gravity back to the bottom via a circulation system. The circulation system can encompass troughs or other flow channels that expose the sorbent to air. Alternatively, the system could be vertical wires on which sorbent flows from top to bottom. The device is sized such that the sorbent is saturated in one pass. A solid system contains moving components on which one or more solid sorbent is bound. These components are mechanically raised into the wind so as to absorb $CO_2$. Once saturated, the components are removed from the wind stream, isolated and stripped of $CO_2$. In another embodiment, a cooling tower contains a $CO_2$ removal zone in the air inlet at the base, which may contain either solid or liquid sorbents in a manner described above.

In another embodiment, a $CO_2$ capture system according to this invention can comprise filter systems wetted by a flow of sodium hydroxide that readily absorbs $CO_2$ from the air, and in the process, converts it to sodium carbonate. Without wishing to be bound by theory, if the pressure drop across the system due to viscous drag is comparable to the kinetic energy density in the air, then the fraction of $CO_2$ removed from the flow stream becomes significant, so long as the sorbent materials are strong absorbers. This is because the momentum transfer to the wall follows essentially the same physical laws of diffusion as the carbon dioxide transfer. In a cooling tower type of system, intake air is pulled through a filter system that is continuously wetted with sodium hydroxide. Another type of system can involve a slight pressure drop generated by other means. In yet another system, air contacts sorbent surfaces simply by the wind (or moving air) passing through the device or system. It will be appreciated that in the design of a contact system, the rate of absorption should be considered. In this regard, the volume of sorbent per unit output of $CO_2$ is independent of the specific details of the air contacting design.

Advantageously, air extraction of $CO_2$ and systems for this purpose can be sited based on site-specific conditions, which can include temperature, wind, renewable energy potential, proximity to natural gas, proximity to sequestration site(s) and proximity to enhanced oil recovery site(s). The system should be designed for ease of relocation. For example, the extractor may be sited at an oil field in order to minimize transport. In such a case, oil could be reformed and used in the calcination system.

In other embodiments, chemical processes, e.g., calcinations and calcining carbonate, are encompassed for the recovery of $CO_2$. One process involves oxygen blown calcinations of limestone with internal $CO_2$ capture. Such calcinations are carried out in a calcining furnace that uses oxygen rather than air. The use of oxygen results in the product stream including only $CO_2$ and $H_2O$, which can be easily separated. In addition, power plant and air capture sorbent recovery can be integrated into one facility. Another process involves electrically heated calcinations. Yet another process involves solid oxide ionic membranes and solid oxide fuel cell (SOFC)-based separation processes (e.g., Example 2). Another chemical process involves the electrochemical separation of $CO_2$ from $Na_2CO_3$, for example, using a three-chamber electrolytic cell containing one cationic membrane and an anionic membrane. The cationic membrane is located between the central cell and the negative electrode while the anionic membrane is located between the center and the cathode. A current is applied to the cell and then sodium carbonate is introduced into the center cell. The ions move toward the opposite electrode. Hydrogen is evolved at the anode and oxygen gas is evolved at the cathode, resulting in the formation of NaOH at the anode and carbon dioxide gas at the cathode. Several cells can be stacked together by placing a bipolar membrane at the electrode locations of the single cell. This serves to reduce the amount of gas evolved per unit reagent regenerated.

The present invention embraces remote $CO_2$ sequestration sites via air capture. Such remote sequestration following the capture of $CO_2$ from air can include ocean disposal from floating platforms or mineral sequestration in territories or environments having the appropriate mineral sites and deposits. The capture of $CO_2$ from air allows $CO_2$ to be disposed of in remote areas that otherwise would be inaccessible to $CO_2$ disposal due to the prohibitively high cost of transporting $CO_2$ to remote locations.

The present invention further encompasses $CO_2$ extraction from the ocean using limestone and dolomite as sources of alkalinity. If provided with sufficient alkalinity, the ocean can remove carbon dioxide from the air. According to this embodiment, ocean disposal can be improved by calcining limestone or dolomite to capture $CO_2$ from the air. During this process, $CO_2$ is released to the air, but the resulting $CO_2$ uptake is nearly twice as large as the initial $CO_2$ emission. Thus, a metal hydroxide, e.g., magnesium or calcium hydroxide, dissolved into the surface of the ocean will raise the alkalinity of the water leading to the additional capture of two moles of $CO_2$ for every mole of $CO_2$ entered into the system. Illustratively, and without limitation, in solid form, an ion, such as a calcium ion, $Ca^{+2}$, can trap one $CO_2$ molecule in the form of $CaCO_3$. However, in dissolved form, the same ion can trap two $CO_2$ molecules as bicarbonate ions ($HCO_3^-$). Therefore, limestone that is heated (calcined) as described herein releases one $CO_2$ molecule, but when it is dissolved in the ocean, two bicarbonate ions are trapped. In this embodiment, the $CO_2$ that is dissolved in the mixed layer at the top of the ocean is kept in solution by the addition of calcium or magnesium ions. The mixed layer typically, but not necessarily, reaches a depth of approximately 100 m. Suitable sources of metal hydroxides include, without limitation, limestone, dolomite, or smaller deposits of magnesium carbonates. Although calcium carbonate is supersaturated in sea water and is thus difficult to dissolve, sea water is still far below the point at which calcium carbonate spontaneously precipitates out, thereby allowing for some increase in carbonate and/or calcium in the surface waters of the ocean. Further, the total dissolved calcium in the ocean is a quite large amount; therefore, the ocean is generally insensitive to additions that could allow for substantial increases in stored $CO_2$. Magnesium carbonate also dissolves in sea water, but at a slower rate than does calcium carbonate. Also, the slow dissolution of magnesium carbonate can raise the carbonate ion concentration of sea water, which may be counterproductive to dissolving additional carbonate. Because added calcium ions disperse relatively rapidly upon exposure to the ocean surface, this can prevent a risk of precipitation of calcium carbonate into the ocean waters.

More specifically regarding this embodiment, a method is provided to introduce alkalinity into the water as one or more metal hydroxides, e.g., without limitation, MgO/CaO; $Mg(OH)_2/Ca(OH)_2$; $MgO/CaCO_3$; or $Mg(OH)_2/CaCO_3$, or a combination thereof. These metal hydroxides are calcination products obtained by calcining a suitable starting calcium carbonate- or magnesium carbonate-containing material, e.g., dolomite, limestone, or magnesite, at a temperature above about 400° C., or above about 900° C. The resulting carbon dioxide is captured and sequestered at the calcination site. For dolomite at a temperature above about 400° C., the CaO component is not calcined, while MgO is calcined at this relatively lower temperature. Calcination can be performed by conventional methods (e.g., Boynton, R. S., 1966, *Chemistry and Technology of Lime and Limestone*, Interscience Publishers, New York, pp. 3, 255, 258), or by using another energy source, such as solar energy, wind energy, electrical energy, nuclear energy, remote sites with unusable methane, etc. According to this method, the calcination product is finely dispersed into ocean or sea water by various procedures. For example, introduction into the water can occur from one or more ships or vessels that drag behind or between them a line that drops fine powder in the water. The size of the line is long enough so that local concentrations of the material are not driven very high. Alternatively, the calcination products can be fashioned into larger pellets, as conventionally known in the art. The pellets are dropped or ejected into the water, dissolve slowly and distribute the material relatively uniformly over a larger area as they drift along. Pellets should contain sufficient amounts of air, e.g., have sufficient air pockets, to float. Such pellets can advantageously be added to the water in larger quantities versus a fine dispersion. Of particular interest are pellets comprising $CaCO_3/MgO$ mixtures. By the practice of this method, the net $CO_2$ balance is positive, even if the $CO_2$ from the calcination is not captured.

Notwithstanding, for every $CO_2$ molecule released by this method, nearly two $CO_2$ molecules are absorbed into the ocean, which takes up $CO_2$ from distributed sources.

In another embodiment, the present invention relates to methods of transitioning from today's energy system comprising unsequestered $CO_2$ resulting from the use of fossil fuels to the capture and disposal of $CO_2$, and ultimately, to renewable energy with recycling of $CO_2$. Such transitioning methods comprise combining $CO_2$ capture with magnesium silicate disposal. In this embodiment, $CO_2$ can be removed from the air, but rather than disposing of the removed $CO_2$, it is used as a feedstock for making new fuel. The energy for the fuel derives from a renewable energy source or any other suitable source of energy that does not involve fossil fuels, such as hydroelectricity, nuclear energy. For example, $CO_2$ is initially collected and disposed of or sequestered in underground deposits (such as in enhanced oil recovery, (EOR)) or in mineral sequestration. In this way, the source of the energy is fossil fuel that can be extracted from the ground. To maintain an environmentally acceptable material balance, the carbon must be re-sequestered or disposed of. Alternatively, carbon can be recycled as an energy carrier. Hydrocarbon, i.e., reduced carbon, contains energy that is removed by the consumer by oxidizing the carbon and the hydrogen, resulting in $CO_2$ and water. The capture of $CO_2$ from air allows the $CO_2$ to be recovered; thereafter, renewable energy can be used to convert the $CO_2$ (and water) back into a new hydrocarbon. The production of hydrocarbon can include a number of processes. Illustratively, Fischer Tropsch reactions are conventionally used to convert carbon monoxide and hydrogen to liquid fuels, such as diesel and gasoline (e.g., Horvath I. T., *Encyclopedia of Catalysis*, Vol. 2, Wiley Interscience, p. 42). Similar methods using $CO_2$ and hydrogen are also established. Hydrocarbon can be produced from $CO_2$ and hydrogen. Hydrocarbon production typically involves the use of energy, e.g., electric energy, to convert water into hydrogen and oxygen, or $CO_2$ into CO and oxygen. Thereafter, fuels such as methanol, diesel, gasoline, dimethyl-ether (DME), etc. can be made.

In other embodiments of this invention, $CO_2$ capture apparatuses and systems are encompassed, especially for use in connection with the described processes. In one embodiment, a wind capture system comprises a $CO_2$ capture apparatus in which the air delivery system relies on natural wind flow. Such a $CO_2$ capture apparatus can be situated in the same or similar areas to those in which wind turbines are employed. In another embodiment, the invention embraces a water spray tower $CO_2$ capture apparatus comprising a cylindrical tower, e.g., approximately 100 feet in height, which is open to the air at its top and contains ground level exit vents. A vertical pipe comprises the center of the tower through which water can be pumped; the pipe can be capped with a nozzle that sprays water horizontally. Water is pumped to the top and sprayed into the air. The resultant evaporation creates a pocket of air that is colder and denser than the air below it. This leads to a down draft which forces air through the exit vents. The exit vents contain a solid or liquid sorbent for $CO_2$ capture. In another embodiment, the invention embraces an air convection tower $CO_2$ capture apparatus comprising a vertical cylindrical tower that is attached to a glass skirt situated approximately 1 foot above the ground level. The glass insulates the air between the ground and itself, which raises the air temperature. The hot air then exits through the central tower. A solid or liquid $CO_2$ capture device is contained in the tower. In another embodiment, the invention encompasses a $CO_2$ capture apparatus comprising a glass covered slope, which comprises a glass sheet situated some distance above ground level, e.g., between 0.3 m and 30 m, depending on the size of the overall apparatus. The glass acts as an insulator that causes the air to heat in the sunshine and this results in a draft up the hill. The resulting flow is guided over $CO_2$ absorber surfaces, which removes $CO_2$ from the air passing through it. In another embodiment, the invention encompasses cooling towers to replace a conventional water cooling liquid with a liquid sorbent. The liquid sorbent evaporates water; in addition, the liquid sorbent collects $CO_2$ in concentrated form. In all cases, the saturated sorbent is stripped of its $CO_2$ as described herein.

In another embodiment, wind funneling devices are optimized for throughput rather than air speed, thereby leading to optimization for $CO_2$ capture and sequestration. For example, air convection towers employed for $CO_2$ capture can be shorter than towers designed for electricity production, since increased height to promote air speed is not a requisite for $CO_2$ sequestration. Further, in such $CO_2$ capture apparatuses, textile membranes are used to separate alkaline fluids from the open air. Such membranes comprise cloth-type fabrics that allow air passage while limiting sorbent loss through spray. An illustrative, yet nonlimiting, fabric is Amoco 2019. Other $CO_2$ capture systems include those that are adapted to wind flow, e.g., venturi flows that create suction on a set of filters that are balanced by adjusting the size of the openings so as to maintain constant flow speed through the filtration system. As an example, FIG. 2 shows a solid structure (black lines) seen from above. As the air moves through the narrowed passage, the pressure drops (Venturi Effect). As a result, the higher pressure air inside the enclosures that are open to the back of the flow will have a tendency to stream into the low pressure air flow. Openings are preferably large in a high speed wind and small in a low speed wind in order to maintain a constant pressure drop across the filter system and thus optimize the efficiency of the collector even in the face of variable wind speeds. By adjusting the size of the opening, e.g., using shutters, baffles, etc., one can control the pressure drop across the filter and can control the amount of air that emerges for optimized flow rates.

It will be appreciated that fans can comprise fan driven $CO_2$ capture apparatuses and systems, e.g., in $CO_2$ capture systems at the site of an oil well to perform EOR. The use of a fan or forced air system ensures a specified air throughput, rather than having to rely on the fluctuations of natural wind. By creating a constant air flow, a specified production can be achieved which may be desirable for production schemes that require constant carbon dioxide output rates. The price for such an arrangement is higher energy cost and capital cost in the installation and operation of fans.

BRIEF DESCRIPTION OF THE DRAWINGS

In FIGS. 2A and 2B, the thick black lines represent a solid structure as seen from above. As the air moves through the narrowed passage, the pressure drops (Venturi Effect). As a result the higher pressure air inside the enclosures that are open to the back of the flow have a tendency to stream into the low pressure air flow.

DETAILED DESCRIPTION OF THE INVENTION

Figure 1:
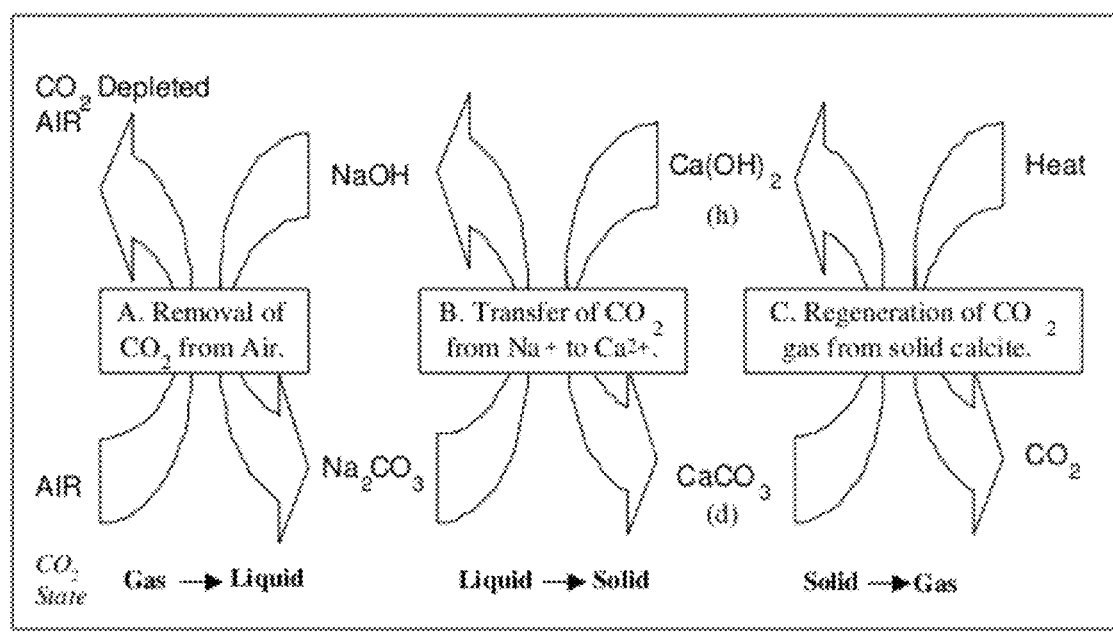
FIG. 1 presents a schematic depiction of an overview of an air extraction process. Drying (d) and hydrating (h) are not specifically shown. In accordance with an embodiment of the present invention, such a process is functionally integrated into an air capture system.
Figures 2A, 2B:
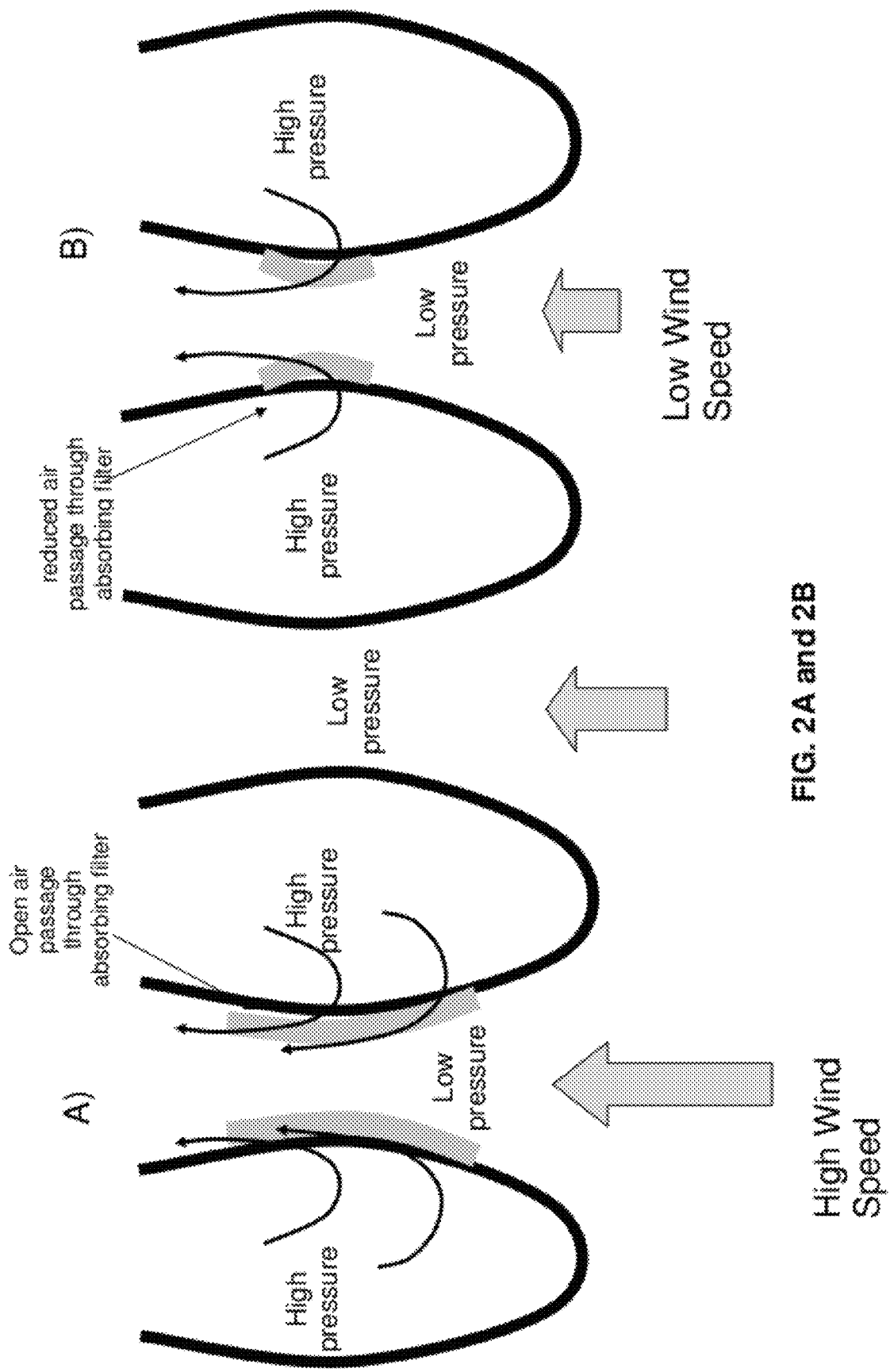
FIGS. 2A and 2B schematically depict a type of $CO_2$ capture system that is adapted to wind flow, e.g., venturi flows.
Figure 3:
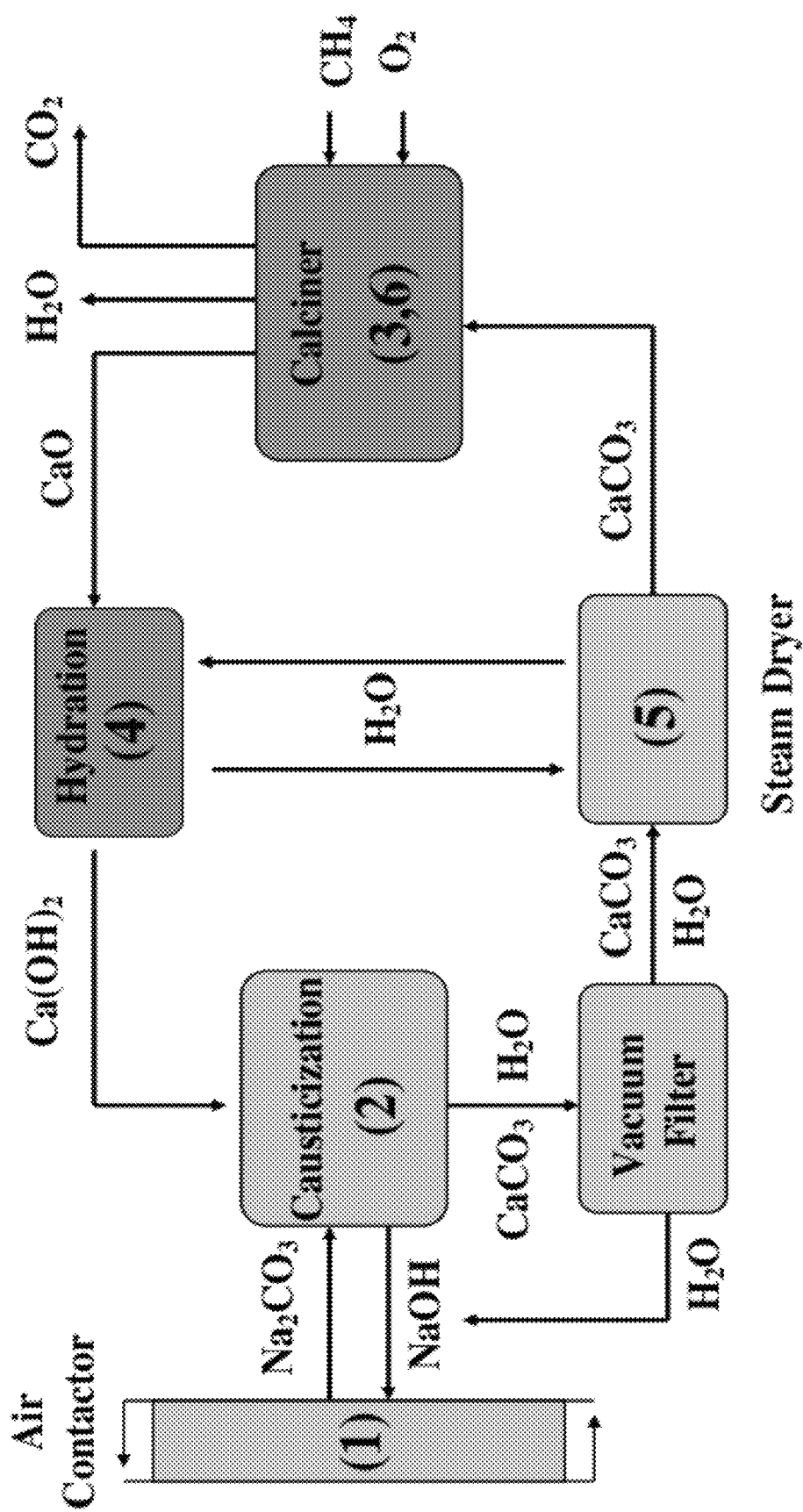
FIG. 3 is a wire diagram showing the process system method for extracting $CO_2$ from air.

Energy and Material Balance of Air Extraction

The combustion of fossil fuels provides the vast majority of the global energy supply. The necessary byproduct of this combustion is carbon dioxide ($CO_2$) gas. Accumulation of $CO_2$ gas in the atmosphere has provoked concern regarding its effect on the global climate and spawned worldwide interest in the reduction of $CO_2$ emissions to the atmosphere. This paper presents a preliminary plant design for removing $CO_2$ directly from the atmosphere.

Existing studies have been performed which focused on the capture of $CO_2$ from large stationary sources as the most promising "strong medicine" approach to carbon mitigation [1,2]. The captured $CO_2$ is compressed, dehydrated, and piped to a disposal site. Herzog concludes that conventional power plants will incur costs of approximately $35 per tonne of $CO_2$ captured. More advanced systems, like the integrated gasification combined cycle (IGCC) and fuel cells, are expected to have slightly lower capture costs. Capture will have to be followed by disposal which will result in a total combined $CO_2$ mitigation cost ranging from $50-85 per tonne of $CO_2$ at the disposal site, raising the cost of electricity from 40 to 200%. Injecting the $CO_2$ into depleted oil or gas reservoirs and into deep coal seams to lower the cost of producing fossil fuels could offset the cost of mitigation.

The present invention is an alternative approach to managing atmospheric emissions through a chemical process, known as air extraction, by which $CO_2$ is removed directly from the atmosphere. It can be estimated that the $CO_2$ capture potential and costs associated with an air extraction plant that produces one tonne per hour of $CO_2$. The process uses wet scrubbing techniques to extract the $CO_2$ and returns it to a gaseous form after several chemical transformations. The wet scrubbing is accomplished by contacting a sodium hydroxide solution (NaOH) with the atmosphere. The chemical absorption of $CO_2$ produces a solution of sodium carbonate ($Na_2CO_3$) which is then causticized using calcium hydroxide ($Ca(OH)_2$). The causticization process transfers the carbonate ion from the sodium to the calcium cation and from the liquid to solid state. The product of this reaction is an emulsion of calcite ($CaCO_3$) in a regenerated NaOH solution. The calcite is filtered, washed, dried, and thermally decomposed by calcination, a common process used in the cement industry for over 100 years [3]. The product of calcination is gaseous $CO_2$ and solid lime (CaO). Hydrating the lime to regenerate the calcium hydroxide completes the cycle. A detailed summary of the chemistry and chemical reactions involved in this process is provided elsewhere [4]. A simplified overview of the system is presented in the drawings.

Process Overview

The $CO_2$ molecule undergoes a sequence of four chemical reactions as it passes through the process. Each reaction will be considered in order to understand the mass and energy balances in a representative system. The complete suite of reactions is shown below along with the enthalpies of reaction given at standard atmospheric pressure and temperature.

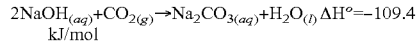

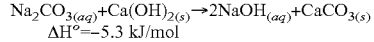

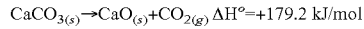

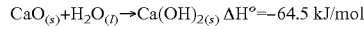

The sum of the reaction enthalpies cited above is zero, as expected given the cyclic nature of the process. A physical implementation of this process will require additional steps and contain inherent inefficiencies. As a thermodynamic minimum, the energy cost is $-RT\log(P_1/P_2)$ where $P_1$ is the ambient partial pressure of $CO_2$ in air (375 ppm) and $P_2$ is the partial pressure of the output stream. Assuming ambient temperature (300K) and an 80 bar output stream, we obtain a minimum penalty of 13.3 kJ/mol. The process may consume more energy.

The $CO_2$ content of air, at 375 ppm, is approximately 0.015 mol per cubic meter ($m^3$). In order to absorb 1 mol of $CO_2$, a minimum of 67 $m^3$ of air must contact the solution. The heat of formation of the reaction will raise the air temperature by ~1.4 K. Some of the heat will also be absorbed by the solution; if all of the heat were to go into solution its temperature will rise by less than 0.1 K. As such the heat generated through reaction (1) will not be recoverable. The small amount of heat generated by reaction (2) will also be lost to a negligible warming of the solution. The result is that reaction (3), the thermal decomposition of calcite, dominates the process and necessitates an external heat source. It is highly desirable to recover as much heat from reaction (4) as possible as it can be used in the process. Summing up the enthalpies of reactions (3) and (4) a minimum heat input of +124.7 kJ/mol can be obtained. This is the equivalent of 2.83 GJ per tonne of $CO_2$, which can be compared to 2.05 GJ per tonne of $CO_2$ for monoethanolamine (MEA) [5]. It should be noted that the temperature at which calcium hydroxide dehydrates is ~700K [6]. Therefore, the energy recovered cannot be used to drive reaction (3).

The calcite will be formed through precipitation, which will entrain water from the solution. The drying of the precipitate will also require energy according to reaction (5) shown below.

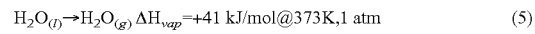

The amount of water entrained with the calcite will be a function of the filtration technology and not the amount of $CO_2$ captured. The net penalty for the process must be overcome by the addition of heat from an external source. One method of obtaining this heat is through the combustion of methane ($CH_4$) according to reaction (6).

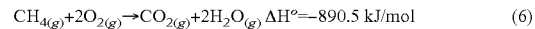

In order to produce the required +179.2 kJ/mol a total of 0.20 mol of methane would be combusted producing an additional 0.20 mol of $CO_2$. In an ideal situation, the combustion $CO_2$ would be captured and sequestered. This means that for every mole of $CO_2$ captured, a minimum of 1.20 moles needs to be compressed and sequestered. In practice, system inefficiencies and process requirements will require a greater input of heat thereby increasing the amount of combustion $CO_2$ generated. Coal may also be considered as a fuel source but would require separation from the lime in order to prevent fouling by the ash.

Absorption of $CO_2$ from Ambient Air

As stated above, the atmospheric concentration of $CO_2$ is approximately 0.015 moles per cubic meter. The absorption of $CO_2$ into hydroxide solutions has been studied [7] and the overall reaction found to be the following:

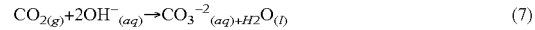

The rate of this equation is given as a constant multiplied by the product of the dissolved $CO_2$ and aqueous hydroxide concentrations. If we assume a well mixed, highly caustic solution then the hydroxide concentration will be much larger than the dissolved $CO_2$ and the reaction will be pseudo-first order. Astarita provides an equation for the $CO_2$ flux under these conditions which can be expressed in terms of the [$OH^-$] concentration of the solution.

$$J_{CO_2} = \sqrt{D_L k_d b_o \rho'_{CO_2}} \quad (8)$$

In this equation, $D_L$ is the diffusivity of $CO_2$ in water; $k_d$ is the kinetic constant; $b_o$ is the concentration of hydroxide; $\rho'_{CO2}$ is the concentration of dissolved $CO_2$ at the surface. For a 1 mol/L NaOH solution at 25° C. the maximum flux is 38 μmol/m² s. This value is larger than the published data [8] ranging from 3 to 10 μmol/m² s. Equation (8) shows the flux to be proportional to the square root of hydroxide concentration. Experiments have shown it to reach a maximum 2.5 mol/L NaOH [9]. At this latter concentration, the NaOH sorbent will have a maximum $CO_2$ loading of 5.5% by mass or one third that of MEA [10].

It is worthwhile to note that the higher flux values obtained by Spector and Dodge occurred when the packed tower was partially filled with packing. This suggests that the wetted wall that would have existed in the top half of the tower was more effective at removing $CO_2$ than the packed section. Using equation (8) the maximum flux is estimated to be 75 μmol/m² s for a 2.5 mol/L solution. By assuming the diffusion through the air side boundary layer follows Fick's Law, this can be assessed further. Using the conservation of mass we can equate the flux through the air and water boundary layers to obtain the following equation.

$$J_{CO_2} = D_G \frac{\Delta \rho_{CO_2}}{\delta} \Rightarrow \delta = \frac{D_G}{\sqrt{D_L k_d b_o} \, K_H} \quad (9)$$

In this equation, $D_G$ is the diffusivity of $CO_2$ in air and $K_H$ is Henry's constant. Substituting the values of 1 and 2.5 mol/L for the NaOH solution a boundary layer of thickness of 6 and 3 mm was obtained respectively. These thicknesses suggest that there is no advantage to turbulent flow. In fact, the larger pressure drop generated under these conditions would increase the energy consumption of the process.

Sizing a capture system for a one tonne of $CO_2$ per hour facility the amount of surface area required is estimated. Given that one tonne of $CO_2$ is 22730 moles, approximately 167,500 and 86,000 m² of surface area is needed for the case of 1 and 2.5 mol/L NaOH respectively. Contacting a solution with the atmosphere will result in evaporation. The amount of evaporation can be controlled by increasing the ionic strength of the NaOH solution [11]. A more concentrated NaOH solution would reduce the required contact area and the evaporative losses but it would require a dilution step prior to causticization.

Causiticization

The aqueous transfer of the carbonate ion from the sodium to the calcium ion is performed ubiquitously in the pulp and paper industry. The reaction is limited by the concentration of the NaOH and in order to precipitate calcite, according to reaction (2), the solution must be limited to 1 mol/L NaOH. If the caustic concentration is higher than this level, the calcite is unstable and will not precipitate [12]. Konno also noted that the size of the precipitate increases with temperature from 5 μm to 15 μm as the solution temperature changes from 25 to 75° C.

The 1 mol/L ceiling provides a size for the reactor vessel for the 1 tonne per hour plant. A one molar solution of NaOH would result in a 0.5 mol/L solution of $Na_2CO_3$ and would therefore require 48 m³ of solution. Reaction (2) will progress to over 90% completion in one hour [13]. In the event that NaOH solutions stronger than 1 mol/L are used, or there is significant evaporation, a dilution step will be required prior to causticization. It is expected that thermal separation would be too inefficient and some form of reverse osmosis is preferable.

Calcination

The end result of the causticization step is the production of calcite ($CaCO_3$) in a solution that is approximately 5% solids by mass. In order to perform the thermal decomposition of reaction (3) it is necessary to dry the solids. It is worthwhile to note that it is not necessary to dewater the precipitate completely as some steam is required for reaction (4). One mole of water per mole of calcite results in a filter cake with a moisture content, mass of water over mass of solids, of 18%. Mechanical dewatering is less energy intensive than thermal drying and as such it is one embodiment of the invention to use this method initially. Vacuum filtration of calcite has been investigated, for similar particle sizes, and an irreducible moisture content of 19.5% was obtained under a vacuum of 96 kPa [14]. It has also been found that the use of ultrasonic energy aids dewatering [15]. In this case Singh obtained a 3% moisture content reduction for coal fines. The remaining water will be evaporated for use in the hydration reaction. Steam drying is an effective method that simplifies material handling and allows for energy recovery. Hanson has investigated this option for the pulp and paper industry and obtained 90% energy recovery [16].

The process of calcination is very mature and a wide variety of designs for lime kilns are in use today [17]. These kilns range in efficiency from 43 to 90%. The efficiency is defined as the theoretical heat requirement (4.1 GJ/tonne) over the actual thermal input. The highest efficiency kiln is the parallel flow regenerative kiln which can reach efficiencies of 90% or higher [18]. It is rated for a particle size of 10-30 mm. The flash calciner is the most efficient kiln rated for particles in the micron range; it is rated at 70%. These kilns are fired using air as the oxygen source. In order to maximize $CO_2$ capture, we would use oxygen to fire the kiln and would expect the efficiency to increase due to the absence of nitrogen. A preliminary estimate can be obtained by recognizing that a kiln with 70% efficiency will consume 0.28 moles of $CH_4$ and therefore 1.15 moles of $N_2$ per mole of $CO_2$ generated. Heating one mole of nitrogen takes 28 kJ of energy; therefore the kiln will approximately consume an extra 730 MJ/tonne $CO_2$ for this purpose. Pure oxygen would lower the thermal input from 5.86 to 5.13 GJ/tonne and raise the efficiency from 70 to 80%.

This process involves several reactions in different phases and as such each reaction can be optimized separately. Given that the majority of the thermodynamic penalty is associated with the calcination reaction, it is desirable to minimize this step. Ongoing research is suggesting that solar ovens may be able to replace a portion of the calcination. Meier et al. have obtained 98% calcination in solar thermal reactors at production rates of kilograms per hour [19]. This technology would have to increase in production by two orders or magnitude and trap the $CO_2$ generated prior to being included for air extraction.

Oxygen Production

The use of combustion energy to drive the calcination reaction will result in the generation of $CO_2$. In order to simplify the capture of the $CO_2$ generated in the kiln, firing the kiln with oxygen is proposed. This will create a flue gas stream consisting mainly of $CO_2$ and steam. Currently the industry standard for oxygen production is cryogenic separation. Much interest is focused on the development of high temperature oxygen separation using ion transport membranes (ITMs). ITMs operate at temperatures around 800-900° C. and offer cost reductions of 30% compared to cryogenic separation [20].

The real value in the ITM technology is the synergy with air extraction. ITMs generate an overall product mix of oxygen, power and steam [21]. All of which are needed for air extraction. The oxygen is released at ~280° C. which will conserve 82 MJ/tonne of $CO_2$ versus cryogenic oxygen. This is not significant compared to the overall energy consumption, however, if the nitrogen off gas is released at the same temperature then 600 MJ of low grade heat are available. This is 66% of the thermal energy required to dry the calcite. The ITM will consume both power and methane. Assuming half of the oxygen is removed from the air stream, then 0.2 moles of methane is required per mole of $CO_2$ to combust the remaining oxygen. This is approximately equal to the amount of methane required to heat the air to firing temperature, 1400° C. Assuming a 40% conversion factor, the turbine will generate approximately 480 kW of power. This system would process ~2,400 m³ of air, significantly less than the volume of air required to remove 1 tonne of $CO_2$ per hour. If the turbine exhaust is mixed with the air extraction intake, the partial pressure of $CO_2$ can be raised from 375 to 450 ppm. This will increase the absorption rate and decrease the surface area needed. The resultant turbine $CO_2$ can also be mitigated by a separate post combustion MEA system.

The exhaust from the turbine may even provide a portion of the driving force for the airflow through the contactor, further reducing power consumption. It is expected that the use of ITM technology will eliminate the need to import power while providing further energy savings by combining two high temperature reactions, oxygen separation and calcination. In this aspect of the invention, the process will use more methane which exposes air extraction even further to price fluctuations.

Preliminary Cost Estimate

Any cost estimate for a novel process is going to contain uncertainties. There is still, however, value in performing the analysis. A first attempt at considering all of the financial charges will highlight which costs will dominate and where further analysis is required. It is also useful to establish a process design. Once a preliminary design is established it can be review by others in the field and any externalities overlooked will be brought to light.

The dominant chemical reaction in this process is the calcination of the limestone according to reaction (3). Keith and Ha-Duong suggest that the capitol cost for a calciner is around $1,000 dollars for each kg $CO_2$/hr of capacity [22]. A one tonne per hour plant would require a capital investment of 1 million dollars for the calciner.

The wet scrubbing will require contact surface which can be estimated from the flux rate calculated above. Using a 2.5 mol/L NaOH solution we will require ~86,000 m² of surface. Using a commercial supplier such as McMaster-Carr® we can purchase 4'×8' polypropylene sheets, 1.6 mm thick, for $23/sheet and a total charge of $330,000. Blowers will be required to move the air. If we extract 66% of the $CO_2$ from the air stream we reach a total throughput of 2.30 million cubic meters of air per tonne of $CO_2$ captured. A 30" direct drive tube-axial fan from the Grainger® 2001-2002 catalog is rated for 25,125 m³/hr and consumes 2 kW of power while retailing for $1,600. This rating is for negligible pressure head. This process would require 92 fans consuming a total 184 kW of power or 0.662 GJ of energy to capture one tonne of $CO_2$ in one hour. This is the equivalent of 16% of the calcination energy, reaction (3), and highlights the significant advantage of natural airflows.

Regardless of the method of filtration, the solution will have to be pumped from the capture site to the precipitation reactor. Assuming that the reaction rate is sufficient for the calciner we can estimate the pumping power required by calculating the energy needed to overcome gravity. Such a calculation would take the form shown below.

$$\text{Power(kW)} = \frac{1}{e} * \left(\frac{\rho Q h}{367}\right) * \frac{1 \text{ kW}}{1000 \text{ W}}$$

If assume a one story pumping height (4 m) is assumed, using the density of a sodium carbonate solution of 1050 kg/m³ reported in the CRC Handbook (p 8-77), and an 80% pump efficiency (e), this equation can be solved. The pumping power requirement would be 640 W which is equivalent to a 2.32 MJ energy penalty to capture a tonne of $CO_2$ in one hour. This is a negligible amount in comparison to the calcination energy and pumping will not contribute significantly to the overall energy requirements. A wet scrubbing technique to capture the $CO_2$ will require additional pumping of the sodium hydroxide solution. For simplicity of calculation it can be assumed that this pumping is equivalent to the energy required to transfer the saturated sorbent to the causticizing vessel. The same battery of pumps would likely be used for both tasks and an energy penalty of 2.32 MJ per tonne of $CO_2$ per hour will be included.

Grainger® also retails an aluminum chemical transfer pump which moves 21 gallons per minute (gpm) at 4 m head. The required pumping is 45 m³/hr or 200 gpm thus necessitating 10 pumps. Each pump retails for $280 and so the battery of pumps would cost ~$3,000. The plant will also require holding tanks to contain the solution during the causticization reaction. Using McMaster-Carr again we obtain a charge of $17,000 for 23 tanks with 560 gallon capacity at $740/tank.

The filtration of the precipitate will require a vacuum filter. This technology is highly process specific and this invention includes only a representative figure. A charge of $100,000 has been included based on prices posted on the internet and an energy penalty of 0.25 GJ/tonne $CO_2$ based on a laboratory vacuum filter. With the exception of the calciner, the costs listed above represent the equipment alone. In order to closer approximate an actual plant one can multiply these costs by a factor of 2.98. This factor is suggested in Perry's Handbook (p. 9-72) and represents the additional cost of equipment installation, piping, electrical, instruments, battery limit building and service, excavation and site preparation, and auxiliaries [23].

Prior to injection into the ground the $CO_2$ will have to be compressed, which will consume energy. Blok et al. give a figure of 281 $kJ_{(e)}$/kg for compression to 80 bar, which will be used in this analysis [24]. Blok et al also list the cost for $CO_2$ compression as $61,200/(ton/hr) installed. The oxygen cost is taken as $27 per tonne of $O_2$ with an energy consumption of 220 kWh/tonne [5].

The table below compares the individual and net energy penalties to the total penalty.

TABLE 1

Energy Metrics for 1 tonne/hr Air Extraction Plant

| Item | Energy penalty (GJ/tonne) | Percent of Total (7.66 GJ/tonne) |
| --- | --- | --- |
| Blowers for Air | 0.662 | 9% |
| Sorbent Recirculation | 0.0023 | 0% |
| Pump to Causticization | 0.0023 | 0% |

TABLE 1-continued

Energy Metrics for 1 tonne/hr Air Extraction Plant

| Item | Energy penalty (GJ/tonne) | Percent of Total (7.66 GJ/tonne) |
|---|---|---|
| Blowers for Air | 0.662 | 9% |
| Filtration of Precipitate | 0.25 | 3% |
| Drying of Precipitate | 1.036 | 14% |
| Heat for Calcination | 5.13 | 67% |
| Cryogenic Oxygen | 0.242 | 3% |
| $CO_2$ Compression | 0.336 | 4% |
| Heat Recovery - Hydrating | (2.39) | (31%) |
| Energy Consumption | 5.27 | 68% |

It is also important to note that the total electrical requirement, i.e. blowers, pumps, oxygen, and compressors, comprise approximately 20% of the total energy penalty. The total power requirement is 415 kW.

The capital costs are assumed to be amortized at 10% over 20 years. Given this information a preliminary cost estimate for the air extraction plant can be performed. As a base case cryogenic oxygen is used, a 2.5 mol/L NaOH solution and a methane fired calciner that is 80% efficient. A filter cake moisture content of 20% can be used and the going market rate for electricity of 4.30/kWh with a multiplier of 1.5 to include carbon capture and storage costs. The going market rates for methane, coal, and electricity were obtained from the NYMEX exchange.

TABLE 2

Cost per tonne of $CO_2$ captured - Base Case

| Costs | Delivered Gas $6.80/MMBtu | Stranded Gas $3.00/MMBtu | Coal $60.5/tonne tce |
|---|---|---|---|
| Capital | 38.54 | 38.54 | 38.41 |
| Fuel | 46.75 | 26.19 | 27.39 |
| Electricity | 28.32 | 28.32 | 33.78 |
| Total | 113.61 | 93.05 | 99.58 |
| Per gallon gasoline | 1.04 | 0.85 | 0.91 |

This data is used to project the effect of process improvements on the cost per tonne of $CO_2$. The effect of increasing the efficiency of the calciner to 90% and decreasing the efficiency of the filtration equipment is investigated. The filter cake is assumed to have a moisture content of 25%.

TABLE 3

Cost per tonne of $CO_2$ captured - Process Efficiency

| Costs | Delivered Gas $6.80/MMBtu | Improved Calciner 90% efficient | High Moisture 25% cake |
|---|---|---|---|
| Capital | 38.54 | 38.54 | 38.54 |
| Fuel | 46.75 | 41.47 | 46.75 |
| Electricity | 28.32 | 27.66 | 28.32 |
| Total | 113.61 | 107.66 | 113.61 |
| Per gallon gasoline | 1.04 | 0.99 | 1.04 |

It is interesting to note that the increased moisture had no effect on the cost. This is because with the steam hydration of reaction (4) there is enough low grade heat to evaporate the water.

The effect of introducing novel technologies into the process can also be projected. Specifically the introduction of solar thermal ovens and ITMs is investigated. The solar thermal oven will have the effect of reducing the fuel consumption significantly, it is assumed that 50% of the calcite is decomposed using this technique. As described above, the ITMs will alter the process significantly. The power produced by the turbine will be used by the plant and as a result a cost reduction on the oxygen is not taken. The use of ITMs will significantly increase the fuel consumption and at $6.80/MMBtu is similar in cost to the base case. As such, the ITMs can be combined with stranded gas and a high efficiency kiln. The final column will present a best case scenario where stranded gas is used as fuel in conjunction with a high efficiency calciner, ITMs and solar ovens.

TABLE 4

Cost per tonne of $CO_2$ captured - Novel Process

| Costs | Delivered Gas $6.80/MMBtu | Solar Oven 50% calcined | ITMs Stranded gas | Best Case All four conditions |
|---|---|---|---|---|
| Capital | 38.54 | 38.54 | 36.21 | 36.21 |
| Fuel | 46.75 | 23.38 | 33.33 | 21.72 |
| Electricity | 28.32 | 25.38 | 0.00 | 0.00 |
| Total | 113.61 | 87.29 | 69.54 | 57.93 |
| Per gallon gasoline | 1.04 | 0.80 | 0.64 | 0.53 |

This study is meant to provide a first attempt at estimating the cost of a large-scale facility designed specifically to extract $CO_2$ directly from the atmosphere. Given the assumptions made air extraction is expected to be competitive with the $CO_2$ capture technologies currently being proposed. More importantly it is unlikely that retrofitting existing power plants will result in 100% $CO_2$ recovery, meaning that some additional $CO_2$ recovery will be necessary even for MEA systems.

There are three general conclusions that can be drawn from this paper. First, the cost of methane is significant for the system proposed. Therefore buying methane from the open market may be prohibitive and other fuels and/or stranded gas would be better sources. In cases where the cost of methane is in the vicinity of $4/MMBtu then this system can be considered. Second, the system is scaled to 1 tonne per hour and any increase in size would likely result in cost savings. Finally, the capital cost of the plant carries a large amount of uncertainty, as the technology is novel. As these systems move towards implementation lower production costs can be expected. It is worthwhile to investigate other options for generating a combustion off-gas stream that contains only $CO_2$ and steam. These options include; solid oxide fuel cells and/or other indirect heating systems. It is expected that the system presented here would be one of the more expensive ones.

The most important conclusion to be drawn from this work is that the process warrants further investigation. Each step of the process has been studied and some cases have been used for over a century. The energy penalty is also concentrated in one step. This provides a suitable focus for improvements in efficiency. As such, optimization for air extraction purposes should be possible. Furthermore, air extraction, even as a small portion of the $CO_2$ mitigation portfolio can have a powerful influence because it is the only industrial $CO_2$ capture technology that can directly affect atmospheric levels. It may also provide an effective alternative to fuel switching. The separation of capture from generation will allow for the optimization of each process individually. This in turn should result in a more efficient use of the primary energy source. In the end, this is the objective of any $CO_2$ mitigation program. In the event that fuel prices reach levels where gas to liquid processes for hydrocarbon production are economical, air extraction can provide suitable feedstock from depleted gas fields.

REFERENCES

1. Herzog H. J., D. E. M., Carbon dioxide recovery and disposal from large energy systems. Annu. Rev. Energy Environ., 1996. 21: p. 145-166.
2. White C. M., S. B. R., Granite E. J., Hoffman J. S., Pennline H. W., Separation and capture of $CO_2$ from large stationary sources and sequestration in geologi formations. J. of the Air & Waste Management Association, 2003. 55: p. 645-715.
3. Boynton, R. S., Chemistry and Technology of Lime and Limestone. 1966, New York: Interscience Publishers.
4. Zeman F. S, L. K. S., Capturing carbon dioxide directly from the atmosphere. World Resource Review, 2004. 16(2): p. 157-172.
5. Herzog, H. J., Assessing the Feasibility of Capturing $CO_2$ from the Air. 2003, Massachusetts Institute of Technology: Boston.
6. Zsako J., H. M., Use of thermal analysis in the study of sodium carbonate causticization by means of dolomitic lime. Journal of Thermal Analysis, 1998. 53: p. 323-331.
7. Astarita, G., Mass Transfer with Chemical Reaction. 1967, Amsterdam: Elsevier Publishing Company. 176.
8. Spector N. A., D. B. F., Removal of carbon dioxide from atmospheric air. Trans. Am. Inst. Chem. Engrs., 1946. 42: p. 827-848.
9. Tepe J. B., D. B. F., Absorption of carbon dioxide by sodium hydroxide solutions in a packed column. Trans. Am. Inst. Chem. Engrs., 1943. 39: p. 255-276.
10. Desideri U., P. A., Performance modelling of a carbon dioxide removal system for power plants. Energy Conversion and Management, 1999. 40: p. 1899-1915.
11. Olsen J., J. A., Aly G., Thermophysical properties of aqueous NaOH—H2O solutions at high concentrations. International Journal of Thermophysics, 1997. 18(3): p. 779-793.
12. Konno H., Y. N., Kitamura M., Crystallization of aragonite in the causticizing reaction. Powder Technology, 2002. 123: p. 33-39.
13. Dotson B. E., K. A. Causticizing reaction kinetics. in 1990 Tappi Pulping Conference. 1990: Tappi Press.
14. Besra L., S. D. K., Roy S. K., particle characteristics and their influence on dewatering of kaolin, calcite and quartz suspensions. Int. J. Miner. Process., 2000. 59: p. 89-112.
15. B. P., S., Ultrasonically assisted rapid solid-liquid separation of fine clean coal particles. Minerals Engineering, 1999. 12(4): p. 437-443.
16. Hanson C., T. H., Steam drying and fluidized bed calcination of lime mud. Tappi Journal, 1993. 76(11): p. 181-188.
17. Oates, J. A. H., Lime and Limestone: chemistry and technology, production and uses. 1998, New York: Weinheim: Wiley-VCH.
18. Cella, G. M., The TWIN-D lime shaft kiln—a new generation. ZKG International, 1995. 48(12): p. 644-650.
19. Meier A., B. E., Cella C. M., Lipinski W., Wuillemin D., Palumbo R., Design and experimental investigation of a horizontal rotary reactor for the solar thermal production of lime. Energy, 2004. 29: p. 811-821.
20. Dillon D. J., P. R. S., Wall R. A., Allam R. J., White V., Gibbins J., Haines M. R. Oxy-combustion processes for CO2 capture from advanced supercritical PF and NGCC power plant, in Greenhouse Gas Control Technologies 7. 2004. Vancouver, Canada.
21. Allam R. J, M. C. J., White V., Stein V., Simmonds M. Oxyfuel conversion of refinery process equipment utilising flue gas recycle for CO2 capture. in Greenhouse Gas Control Technologies 7. 2004. Vancouver, Canada.
22. Keith D. W., H.-D. M. CO2 capture from the air: technology assessment and implication for climate policy. in Greenhouse Gas Control Technologies 6. 2002. Kyoto, Japan: Pergamon.
23. Perry R. H., G. D. W., ed. Perry's Chemical Engineers' Handbook. 7th ed. 1997, McGraw-Hill: New York.
24. Blok K., W. R. H., Katofsky R. E, Hendriks C. A., Hydrogen production from natural gas, sequestration of recovered CO2 in depleted gas wells and enhanced natural gas recovery. Energy, 1997. 22(2/3): p. 161-168.

ADDITIONAL EMBODIMENTS

Drying the calcite precipitate: One step in the air extraction process as discussed before is the refreshing of the sodium hydroxide sorbent solution. After this sodium hydroxide solution has passed through the air extractor unit it has become enriched in sodium carbonate. By letting the sodium carbonate react with calcium hydroxide, in a process shaped after the Kraft process, the sodium carbonate is turned back into sodium hydroxide solution leaving behind a calcium carbonate (calcite) precipitate. This precipitate is formed in an aqueous suspension from which it needs to be separated. Thickeners may provide one approach to reduce the liquid content, but fine suspensions have a tendency to hold a large amount of water. Wet calcite should not enter the calciner as the energy penalty for driving off the steam in the calciner would be very large and reduce the overall efficiency of the process. Therefore, the invention discussed here adds mechanical dewatering steps into the process flow diagram in order to reduce the water content as much as possible. A first such step would involve the filtration of the calcite producing a wet filter cake. Depending on the details of the downstream processing it may prove advantageous to wash the filtrate to remove most of the remaining sodium hydroxide, but regardless of this step, the next steps will involve mechanically dewatering of the calcite filter cake.

It is noted, however, that the calcium oxide formed in the calciner needs to be converted to calcium hydroxide by adding water that could easily be derived from the wet calcite. (This process will be referred to as slaking even if it is performed in a gas solid reaction of lime and steam.) One part of the invention is to use mechanical dewatering steps that ideally reach a water content of 15% in the calcite material, followed by a thermal drying process that uses heat from the reaction $CaO+H_2O \rightarrow Ca(OH)_2+heat$. In an optimal design this process will be performed at elevated temperatures were the water is present as steam. The heat of the reaction would be transferred by methods known to those practiced in the art to the wet calcite. The hot steam will raise the temperature of the filter cake and thus cause the release of the remnant water as steam which is transported back to the slaking unit. One approach is to use heat exchangers between the fluidized bed performing the slaking the other is to circulate hot steam between the two beds. Some of this steam will be consumed in the slaking process the rest is used to carry the heat of the process away. The hot steam by heating the water in the calcite filter cake would drive the production of additional steam which ideally is just sufficient to replace the consumed water. In practice, the filter cake may prove to be too dry, in which case make up water has to be added to the cycle, or too wet in which case some of the excess steam must be released and condensed out. The slaking process releases an amount of heat sufficient to boil off about 2.5 moles of water.

The heat contact could be achieved by hot gas streaming over and through the filter cake, or indirectly by heating the surfaces on which the wet filter cake rests. Practical implementations may utilize both forms of heating. Heat transfer to hot surfaces for wet filter cake may simplify the heat transfer. But once the material is sufficiently dry, entrainment in a gaseous flow may prove advantageous. This latter approach reduces the need for grinding up the dried up filter cake. Of course it is also possible to use lower grade heat that is available in the heating and cooling steps of the process for the drying steps and conserve the high quality heat that is generated in the slaker for other processes, including steam generation for electricity production. Roughly, the heat of hydroxylation from steam is sufficient to convert 2.5 moles of water into steam.

A variation of this method which also relies on the slaking operation to drive the drying of the calcite would be to use the dry lime as a drying agent as it is strongly hygroscopic until it is converted to calcium hydroxide. In such an implementation it is important, however, that the dewatering step reduced the water content of the wet calcite to less than one mole of water per mole of limestone or to a moisture content of less than 15% by weight.

Specific implementations of the calcium carbonate/calcium hydroxide cycle are outlined that amplified on drying schemes that incorporate the heat of hydroxylation into the drying of the calcium carbonate precipitate.

Use of sonic energy to assist precipitate filtration. The following discussion amplifies on the implementation of the mechanical dewatering step of the process. Since Mechanical dewatering steps are far more energy efficient than thermal drying operations. The optimum water content of the filter cake is about 15% moisture content by weight. Steam drying or other approaches of removing the remnant water from the system. The filter cake is dewatered either by pressing or moving through a filtration step to minimize its liquid content. If so desired it is washed with water to remove sodium hydroxide. The remaining moisture is then removed once more. Besra et al. state that using vacuum filtration one can expect to produce a minimum water content of ~20% by weight. This suggests that for every mole of water precipitated out there are approximately 1.4 moles of water that need to be removed by drying. This part of the invention concerns itself with methods to drive the remnant water content down to 15%. For this purpose filtration is combined with the application of high frequency sonic energy. This can reduce the water content of a filter cake by several percent. The novel aspect of this invention is to use sonication in calcite filtration to adjust the water content of the calcite precipitate to 15%. The delivery of sonic energy is adjusted to maintain constant moisture content.

Use of surfactants to assist precipitate filtration with subsequent combustion. Similarly, the addition of surfactants to the filter cake has been found to reduce water content in coal fines and is expected work as well with other materials. Surfactants are a group of molecules that consist of long carbon/hydrogen chains in which one end has a slight charge and different molecular components. Once the calcite has been filtered it is dried and then heated to ~900 degrees Celsius in order to induce thermal decomposition. In the implementation envisioned here oxygen and fuel are mixed with the calcite to provide the heat of calcination. Therefore the surfactant molecules will act as additional fuel and release their energy through combustion processes. The release of energy will serve to reduce the additional fuel energy required to thermally decompose the calcite. One novel aspect of the invention is the use of surfactants in calcite filtration and subsequent combustion. Effective surfactants should be of low cost and be limited to chemical constituents that do not create harmful combustion products. Illustrative examples are sodium salts of fatty acids (soaps).

Use of rice husks or other suitable biomass for filtration with subsequent combustion. There are a number of filtration aids that added to the precipitate prevent its complete agglomeration and thus maintain pathways for the water to drain out during filtration. A known filtration aid of this type are rice husks. Rice husks would mix in with the calcite, they would be combusted in the calcination step and thus provide a fraction of the energy input in a carbon neutral manner. This technique is similar to 3) with the exception that solids are used as filtration aids rather than surfactants which change the surface wetting properties in the solid liquid interaction. An additional consideration is that these rice husks would introduce a biomass fuel component in the calcination step. Since the CO2 from this combustion step is captured, together with the CO2 that is freed from the limestone, the net effect is an additional capture of CO2 from air via the photosynthesis that created the rice husk. One novel aspect of the invention is the use of rice husks in calcite filtration and calcination.

Hollow screw heat exchanger to heat natural gas. The thermal decomposition of the calcite is expected to occur at temperatures at or above 900 degrees Celsius. As such, the combustion gases, oxygen and natural gas will require preheating in order to maximize efficiency. One potential method is to use the heat contained in the calcium oxide leaving the reaction vessel. It is anticipated that the vessel will be similar to a cyclone use for gas cleaning. In this configuration, the solid particles leave through an opening in the bottom of the vessel. This invention proposes placing a vertical screw at this location to contact the falling calcium oxide particles. The contact between the calcium oxide and the screw will result in the transfer of heat to the screw. This invention also proposes to use the natural gas and oxygen as separate cooling fluids in a counter current system. These fluids will heat up to the reaction temperature prior to be injected into the vessel for combustion. The calcium oxide will be cooled from 1300 to 600 degrees Kelvin yielding approximated 37 kJ of heat per mol of calcium oxide.

The feasibility of such a device will be evaluated by calculating the size of a potential screw. The simplest design is one where the screw consists of a hollow rectangular strip of metal. For this analysis it is assumed the opening in the screw is 25 cm long and 10 cm high with a 2.5 cm cast iron wall. The CRC handbook lists a thermal conductivity of iron of 34 W/m K at 973 degrees Kelvin.

This analysis is based on a 1 tonne of $CO_2$ per hour air extraction plant. In this case a mass flow of 1285.2, 345.6 and 86.4 kg/hr for calcium oxide, oxygen and methane are expected, respectively. This can also be expressed in molar flows of 22.95, 10.8 and 5.4 kmol/hr. Using available heat capacity data one can calculate that the calcium oxide will release 850 MJ of heat, the oxygen and methane will absorb 466 and 352 MJ respectively. This means there is a slight excess of heat consisting of 32 MJ contained in the calcium oxide.

The CRC Handbook also lists the densities of methane and oxygen as 0.02 mol/L at 600K and 0.03 mol/L at 380 K respectively. Using these densities the mass flows can be converted to volumetric flows and find that the methane will must flow at 75 L/s and the oxygen at 100 L/s. Given the geometry assumed above one can calculate flow velocities of 3 and 4 m/s.

Given that the calcium oxide will retain some of its heat it is assumed that a small temperature change of 50 degrees Kelvin exists for the counter current heat exchanger. If the cast iron surface is treated as a uniform wall, one can estimate the heat flux across it. The flux $q''=k/L*\Delta T$ where k is the conductivity, L is the thickness and $\Delta T$ is the temperature change. Solving this equation we obtain a heat flux of 68 kW/m². The required heat flux is 850 MJ in one hour or 236 kW which would therefore require a surface area of 3.5 m². For the above mentioned cavity, this is a length of 14 m or 18 complete revolutions around a screw axis. If it is assumed that one revolution requires three times the thickness, then an 8 m long screw is obtained. If it is assumed that a void ratio of 1 and a density of 2.7 Mg per m³ then a total calcium oxide volume of 0.95 m³ can be calculated. If this volume were spread evenly over the surface it would be 27 cm thick. All of the above-mentioned quantities are within the limits of current engineering practices. One aspect of the invention is the use of a hollow screw as a heat exchanger.

Laminar Forced Draft Tower. This invention is a novel way of scrubbing a volume of gas in a contained system. The device is a vertical tower with solid outside walls. The inside of the tower consists of vertical tubes placed adjacent to each other in a honeycomb like structure. The tower height would range from 1 to 3 m. The top and bottom of the pipe stack would be covered with a plate that blocks the annular spaces thereby allowing fluid flow through only the tubes. This system will allow any liquid sorbent to be distributed above the stack, flow down the inside walls of the tubes and be collected at the bottom. The gas flow, in our case air, will flow up the tower countercurrent to the sorbent. The diameter of the tubes will be such that the airflow up the stack will be laminar. The air inlet below the tube stack will ring the base of the tower to allow a concentric flow of air up the tower. The airflow in this tower can be generated by active, fans, or passive means. One aspect of the invention is the use of the tower in a forced draft, wet scrubbing system.

Natural Draft Air Flow System. This invention describes ways to move a gas through a forced draft system using passive energy sources such as the sun and the wind. The wind can be harnessed using Venturi devices in order to create a vacuum at the top of the tower. A venturi consists of a conical structure that is open at both ends and exposed to the wind. The venture is able to rotate such that larger opening is facing the wind, as the wind passes through the device the physical restriction caused by the cone results in an increase in air velocity and a decrease in pressure. A conduit is connected from the base of the venturi to the tower such that this drop in pressure creates a vacuum in the conduit and draws air through the tower. Solar energy can be used to create a natural draft by encasing a volume of air in glass. As the solar energy heats the air in the glass it increases the pressure in the structure and the air will rise. Another conduit is connected from the bottom of the glass structure to the top of the tower such that as the air in the glass rises it will draw air through the tower. One aspect of the invention is the use of a natural draft air flow system in an air scrubbing system.

Small tube coal combustor. The invention proposes a coal combustion system that occurs in small tubes using oxygen gas. This system would contain many tubes each less that 6" in diameter and located on small angle relative to the horizontal plane. Fine coal particles would be fed into the elevated end and slowly slide down to the low end. This motion may be assisted by vibration if necessary. The low end of the tube contains the oxygen feed, a flame, and an ash collector. The flame ignites the oxygen and coal to maintain a steady temperature in the tube. The ash is collected and removed from the system. The tubes can be submerged in water or another medium in order to transfer the heat of combustion to the working fluid. One potential use of these tube bundles would be in generating steam for power generation while another may be to provide heat to calcite particles for calcination. In one embodiment, the tube is solidly filled, in another embodiment, the tube utilizes a fuel injector. Since coal is a very cheap fuel for the calcination process cost effective implementations may use coal for the calcination step. However, coal because of its ash content should not be mixed with the lime that is to be recycled. Consequently, this invention aims to develop a system of internally heated tubes that provide the heat source for the calcination and transfer heat into the fluidized limestone bed by means of heat exchanger surfaces. One such implementation would be tubes that are filled with coal.

Another design would be one where the calcium oxide is moving through small entrained beds that consist of tubes that cross through what looks like a big conventional boiler. Coal fines are injected with a small amount of CO2 as a driving gas into a long tube in which coal fines and oxygen mix. One aspect of the invention is the use of a small scale coal fired heat source.

Air Extraction

Mitigating the majority of the anthropogenic $CO_2$ emissions may require a variety of solutions. This is due to the varied nature of the emissions, both in location and magnitude. Different problems require different solutions. Air extraction refers to the removal of gaseous CO2 from ambient air. It produces a stream of concentrated $CO_2$ ready for sequestration. By its nature, air extraction can capture $CO_2$ from any source. A specific implementation the $Na^+/Ca^{2+}$ process is presented below.

Air extraction enables $CO_2$ trading by capturing $CO_2$ anywhere, any time and from any emitter. It is a stand-alone technology that can be mixed with other capture schemes allowing separate optimization of energy conversion, capture and storage. It is well suited for: distributed and/or mobile sources, existing infrastructure ill-suited for retrofit, handling leakage from storage sites, challenging $CO_2$ transport scenarios, driving capture to or above 100%.

In one embodiment, the following chemical reactions are included in the method:

A. Extraction/Capture from the Atmosphere $$2NaOH(aq) + CO_2(g) \rightarrow Na_2CO_3(aq) + H_2O(l); \Delta Ho = -109.4 \text{ kJ/mol}$$

B. Causticization $$Na_2CO_3(aq) + Ca(OH)_2(s) \rightarrow 2NaOH(aq) + CaCO_3(s)$$
$$\Delta Ho = -5.3 \text{ kJ/mol}$$

C. Calcination $$CaCO_3(s) \rightarrow CaO(s) + CO_2(g); \Delta Ho = +179.2 \text{ kJ/mol}$$

D. Hydration $$CaO(s) + H_2O(l) \rightarrow Ca(OH)_2(s); \Delta Ho = -64.5 \text{ kJ/mol}$$

E. Drying

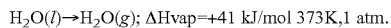
$H_2O(l) \rightarrow H_2O(g)$; $\Delta Hvap=+41$ kJ/mol 373K, 1 atm.

F. Combustion

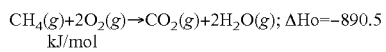
$CH_4(g)+2O_2(g) \rightarrow CO_2(g)+2H_2O(g)$; $\Delta Ho=-890.5$ kJ/mol A. Capture from the atmosphere. The overall reaction that takes place during absorption in this embodiment of the invention is: $2NaOH(aq)+CO_2(g) \rightarrow Na_2CO_3(aq)+H_2O$. The rate equation is: $r_g=k_d[CO_2][OH^-]$. Given that $[CO_2]$ is ~10 μmol/L at eq., it can be assumed that the reaction is first order as long as the pH is >11. The eqn is:

$$J_{CO_2}=\sqrt{D_L k_d b_o \rho'_{CO_2}}$$

for 1 mol/L at 25° C. J=38 μmol/m² s. In this aspect, the absorption reaches a maximum at 2.5 M. In another aspect, the $CO_2$ is captured from the atmosphere using an alkaline absorber in a wet scrubber according to the above reaction. The flux produced by this reaction can be estimated using kinetic theory 1 and is given by equation (8). In this equation, $D_L$ is the diffusivity of $CO_2$ in water; $k_d$ is the kinetic constant; $b_o$ is the concentration of hydroxide; $\rho'cO2$ is the concentration of dissolved $CO_2$ at the surface. For a 1 mol/L NaOH solution at 25° C. the maximum flux is 38 μmol/m² s. This value is larger than the published data[2] ranging from 3 to 10 μmol/m² s. The $CO_2$ flux is proportional to the square root of molarity, until it reaches a maximum[3] at 2.5 mol/L. This translates to a theoretical flux of 75 μmol/m² s. A scrubber thus requires about 1000 m² of internal surface per square meter of air flow for efficient removal.

B. Transfer from Sodium to Calcium Ion.

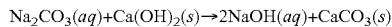
$Na_2CO_3(aq)+Ca(OH)_2(s) \rightarrow 2NaOH(aq)+CaCO_3(s)$

The absorbed $CO_2$ can be removed through precipitation using calcium hydroxide according to the above reaction. The reaction is spontaneous. This reaction is limited by the hydroxide concentration as stable calcite precipitate will only form in solutions equivalent to 1 to 2 mol/L $NaOH_4$. The process is well documented in the pulp and paper industry and will reach over 90% completion in less than an hour. Temperature affects both the kinetics of the reaction and the size and type of precipitate formed. The size of the crystals increase from 5 μm to 15-25 μm as the temperature rises from 25° C. to 75° C. The kinetics and precipitate size can improve with temperature. The increased particle size can improve filtration.

C. Separation Calcite Drying and Hydrating.

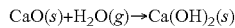
$CaO(s)+H_2O(g) \rightarrow Ca(OH)_2(s)$

Given the upper limit of 1 mol/L NaOH, the emulsion resultant from the causticization step will contain approx. 5% solids. Filtration, for a similar particle size, can produce calcite filter cakes with a moisture content of 19.5% under a vacuum of 96 kPa. This is close to the optimum filter cake moisture content for this process. The heat required to evaporate water will be obtained from the hydration reaction shown above. This reaction produces 2.4 GJ of heat per tonne of $CO_2$ but is limited by the dehydration temperature of 420° C. In order to generate sufficient steam for the hydration reaction from the drying step, the calcite filter cake would require a moisture content of 15%. One suitable method is steam drying. The calcinations step is a mature technology with minimal energy penalty of 4.1 GJ/tonne $CO_2$. Modern kilns get 90% efficiency, and a flash calciner gets 70%. Conversion to oxy-fuel would raise it the efficiency to 80% or 5.13 GJ. In one aspect of the invention, Solar Thermal Ovens achieve 98% conversion for kg/hr.

D. Regeneration Via Thermal Decomposition.

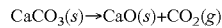
$CaCO_3(s) \rightarrow CaO(s)+CO_2(g)$

The calcination of the limestone returns the CO2 to gaseous form in a concentrated stream. The thermal decomposition of calcite occurs at ~900° C. in pure $CO_2$ (pCO2=1 atm.) according to the above equation. This process is commercially mature and for the given particle size of 5-25 μm, a flash calciner or fluidized bed would be suitable. The theoretical energy penalty for the calcination reaction is 4.1 GJ/tonne of $CO_2$ while the flash calciner operates at ~5.87 GJ/tonne of $CO_2$ or at 70% efficiency. The required heat input can is obtained by the combustion of coal gas or methane while the resultant $CO_2$ can be captured by using pure oxygen instead of air as the $O_2$ source. The high $CO_2$ content of the reactor gas will inhibit the reaction kinetics. This effect can be countered by raising temperature or introducing steam into the reactor.

5. Air Capture Device. Given the atmospheric $CO_2$ concentration of ~380 ppm or 0.015 mol/m3, removing one tonne of $CO_2$ per hour will require 2.3 million cubic meters of air, assuming 66% removal. At an airflow speed of 2 m/s one requires a frontal area of 18 m by 18 m. Scrubber surfaces internal to the device are about a factor of 1000 larger. This can be achieved with a variety of packing. A forced draft, packed tower using a Rauschert™ Hi-Flow Rings (313 m2/m3) would require a volume of 2000 m³ or ~30 towers of 10 m height and 3 m diameter. If the absorption rate were raised to the physical limit near 75 μmol/m² s then the number of towers would be reduced to 4. Slow wind speeds maximize contact time while minimizing the loss of kinetic energy. Assuming the ideal system operates at the edge between liquid and airside limitations in a liquid side limited regime, one can calculate the air side boundary layer thickness (δ) using Fick's Law of Diffusion. Using the 1 mol/L solution we obtain an air side boundary layer thickness of 6 mm. A boundary layer of this thickness allows for operation in the laminar regime. Together with the desire to keep the capture system as compact as possible, this determines the geometry of the system.

6. Process Options to Increase Efficiency.

Highly Caustic Solutions—Wet scrubbing results in the loss of water vapor entrained in the exit gas. As a result, make up water will be required and may limit the site selection if cost and supply are unfavorable. The amount of water loss can be controlled by manipulating the NaOH concentration of the absorbing solution. Water losses are eliminated when the hygroscopic solution is in equilibrium with the ambient relative humidity.

Solar Oven The calcination reaction is the most energy intensive portion of the process. Reducing the amount of fuel consumed would decrease the cost per tonne of $CO_2$ significantly. A solar rotary kiln can produce 98% purity lime at a production rate of kg's per hour. If this technology can be scaled up to tonnes per hour then it may be suitable for air extraction. Additionally, the use of calcite as a refractory lining would increase the efficiency of the flash calciner proposed.

Hot Causticization As stated above, the higher the temperature of the causticization reactor the larger the precipitate and the more efficient the filtration. Any attempt to heat the solution would require ~10 GJ of energy. The large volume of water (48 m³) does, however, provide an excellent heat sink for all waste heat that is produced in the process. Even if it falls short of 10 GJ, it nevertheless improves the properties of the precipitate.

Filter Aids Filter aids are added to the precipitate in order to maintain pore size, make the cake less compressible, and provide faster filtration.

What is claimed is:

1. A system for extracting or capturing carbon dioxide from atmospheric air, comprising:
    adjacent towers each including a front portion, side portions joined with said front portion and extending to end edges, and an open back portion defined between said end edges, said tower portions including front surfaces and back surfaces, said towers positioned so as to define a narrowed passage therebetween;
    a wet scrubbing mechanism positioned within each open back portion between said end edges, said wet scrubbing mechanism introducing a basic solution to absorb at least a portion of an amount of carbon dioxide contained in atmospheric air flowing through each open back portion thereby forming a carbonate solution;
    a filter positioned on said back surfaces;
    adjustable openings defined in side portions of said towers that are adjacent to said narrowed passage, said openings providing a conduit between said front and back surfaces via said filter;
    a treatment module including a supply of reagent in communication with said carbonate solution for causticizing said carbonate solution; and
    a regeneration module for hydrating solid components remaining after said treatment module to regenerate a base material included in said basic solution.

2. The system according to claim 1, wherein said narrowed passage is configured to cause atmospheric flowing therein to reduce in pressure thereby drawing atmospheric air located in said open back portion and having a higher pressure through said filter and into said narrowed passage.

3. The system according to claim 1, wherein said adjustable openings are defined by shutters or baffles.

4. The system according to claim 1, further comprising a supply of basic solution in fluid connection with said wet scrubbing mechanism.

5. The system according to claim 4, wherein the base material included in said basic solution is selected from sodium hydroxide, calcium hydroxide, and potassium hydroxide.

6. The system according to claim 5, wherein the base material is sodium hydroxide.

7. The system according to claim 1, wherein the carbonate solution is a sodium carbonate ($Na_2CO_3$) solution.

8. The system according to claim 1, wherein said supply of reagent is sodium tri-titanate or calcium hydroxide.

9. The system according to claim 1, wherein said openings are increased in size when a high speed wind is moving through said narrowed passage and decreased in size when a low speed wind is moving through said narrowed passage thereby maintaining a substantially constant pressure drop across said filter.

10. The system according to claim 1, wherein said treatment module further comprises a heat source for heating or calcining said carbonate solution.

* * * * *